(12) United States Patent  (10) Patent No.: US 9,009,630 B2
Kruzeniski et al.  (45) Date of Patent: Apr. 14, 2015

(54) ABOVE-LOCK NOTES

(75) Inventors: Michael J. Kruzeniski, Seattle, WA (US); Joseph B. Tobens, Seattle, WA (US); Jon Bell, Seattle, WA (US); William Scott Stauber, Seattle, WA (US); Rohit Bhatia, Hyderabad (IN); Ram Pattabhi Papatla, Hyderabad (IN); Daniel Escapa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 69 days.

(21) Appl. No.: 13/489,165

(22) Filed: Jun. 5, 2012

(65) Prior Publication Data

US 2013/0326582 A1  Dec. 5, 2013

(51) Int. Cl.
*G06F 3/048* (2013.01)
*G06F 3/0488* (2013.01)
*G06F 21/60* (2013.01)
*G06F 3/14* (2006.01)

(52) U.S. Cl.
CPC .......... *G06F 3/04883* (2013.01); *G06F 21/604* (2013.01)

(58) Field of Classification Search
CPC .. G06F 3/04883; G06F 3/0482; G06F 21/604
USPC .................. 715/864, 833, 825, 817
See application file for complete search history.

(56) References Cited

U.S. PATENT DOCUMENTS

| | | | |
|---|---|---|---|
| 6,222,909 B1 | 4/2001 | Qua et al. | |
| 6,662,026 B1 | 12/2003 | Cordray et al. | |
| 7,095,442 B2 | 8/2006 | van Zee | |
| 7,126,626 B2 | 10/2006 | Sawahara et al. | |
| 7,495,652 B2 | 2/2009 | Klinghult | |
| 7,643,895 B2 | 1/2010 | Gupta et al. | |
| 7,657,849 B2 | 2/2010 | Chaudhri et al. | |
| 8,082,523 B2 | 12/2011 | Forstall et al. | |
| 8,136,053 B1 * | 3/2012 | Miller et al. | 715/863 |

(Continued)

FOREIGN PATENT DOCUMENTS

| | | |
|---|---|---|
| CN | 101551727 A | 10/2009 |
| CN | 101739205 A | 6/2010 |

(Continued)

OTHER PUBLICATIONS

Andrew, et al., "Investigating the Use of Voice and Ink for Mobile Micronote Capture", *In Proceedings of the 12th IFIP TC 13 International Conference on Human-Computer Interaction*: Part I, vol. 5726, Aug. 26, 2009, pp. 782-795.

(Continued)

*Primary Examiner* — David Phantana Angkool
(74) *Attorney, Agent, or Firm* — Aaron Chatterjee; Peter Taylor; Micky Minhas

(57) ABSTRACT

A note-capture application is disclosed that allows notes to be displayed on the lock screen. In one embodiment, a note-capture application can be invoked when a mobile device is in an above-lock state. Note data can be captured using the note-capture application, and the captured data can be persistently displayed on the lock screen. A user can perform a unique gesture from the lock screen to invoke the note-capture application. In another embodiment, multiple input modes can be available for note data capture. For example, voice data, text data, camera data, etc. can all be used to capture notes for display on the lock screen.

19 Claims, 19 Drawing Sheets

(56) References Cited

U.S. PATENT DOCUMENTS

| | | |
|---|---|---|
| 8,239,784 B2 | 8/2012 | Hotelling et al. |
| 8,539,382 B2 * | 9/2013 | Lyon et al. ............ 715/863 |
| 2002/0173345 A1 | 11/2002 | Swerup et al. |
| 2003/0034185 A1 | 2/2003 | Kaikuranta |
| 2004/0072589 A1 | 4/2004 | Hamamura et al. |
| 2005/0116840 A1 | 6/2005 | Simelius |
| 2005/0197103 A1 | 9/2005 | Inoue |
| 2006/0284969 A1 | 12/2006 | Kim et al. |
| 2007/0016958 A1 * | 1/2007 | Bodepudi et al. ............ 726/27 |
| 2007/0032202 A1 | 2/2007 | Hamamura et al. |
| 2007/0150842 A1 | 6/2007 | Chaudhri et al. |
| 2007/0234235 A1 | 10/2007 | Scott |
| 2008/0119217 A1 | 5/2008 | Coxhill |
| 2008/0168379 A1 | 7/2008 | Forstall et al. |
| 2008/0196945 A1 | 8/2008 | Konstas |
| 2008/0220752 A1 * | 9/2008 | Forstall et al. ............ 455/415 |
| 2008/0254767 A1 | 10/2008 | Jin |
| 2008/0318550 A1 | 12/2008 | DeAtley |
| 2009/0006991 A1 | 1/2009 | Lindberg et al. |
| 2009/0061837 A1 * | 3/2009 | Chaudhri et al. ............ 455/418 |
| 2009/0089886 A1 | 4/2009 | Cheng et al. |
| 2010/0001967 A1 | 1/2010 | Yoo |
| 2010/0060586 A1 * | 3/2010 | Pisula et al. ............ 345/169 |
| 2010/0079380 A1 | 4/2010 | Nurmi |
| 2010/0090564 A1 | 4/2010 | Oh et al. |
| 2010/0123664 A1 | 5/2010 | Shin et al. |
| 2010/0127998 A1 | 5/2010 | Hyun |
| 2010/0146384 A1 * | 6/2010 | Peev et al. ............ 715/255 |
| 2010/0159995 A1 * | 6/2010 | Stallings et al. ............ 455/566 |
| 2010/0162182 A1 | 6/2010 | Oh et al. |
| 2010/0248689 A1 * | 9/2010 | Teng et al. ............ 455/411 |
| 2010/0269040 A1 | 10/2010 | Lee |
| 2010/0306705 A1 | 12/2010 | Nilsson |
| 2010/0306718 A1 | 12/2010 | Shim et al. |
| 2011/0081889 A1 | 4/2011 | Gao et al. |
| 2011/0248941 A1 | 10/2011 | Abdo et al. |
| 2011/0267306 A1 | 11/2011 | Chang et al. |
| 2012/0009896 A1 | 1/2012 | Bandyopadhyay et al. |
| 2013/0283199 A1 * | 10/2013 | Selig et al. ............ 715/781 |
| 2014/0040756 A1 * | 2/2014 | Bukurak et al. ............ 715/741 |
| 2014/0331158 A1 * | 11/2014 | Hicks et al. ............ 715/769 |

FOREIGN PATENT DOCUMENTS

| | | |
|---|---|---|
| KR | 10-2004-0093330 A | 11/2004 |
| KR | 10-2010-0000274 A | 1/2010 |
| KR | 10-2010-0005438 | 1/2010 |
| KR | 10-2010-0039957 A | 4/2010 |

OTHER PUBLICATIONS

Denoue, et al., "Shared Text Input for Note Taking on Handheld Devices", *In Proceedings of ACM Human Factors in Computing Systems*, Apr. 20, 2002, pp. 794-795.

Hughes, "Cingular Blackjack," 3 pages (document marked Feb./Mar. 2007, downloaded before Jun. 30, 2010).

International Search Report for PCT/US2011/043273, mailed Feb. 9, 2012, 4 pages.

* cited by examiner

FIG. 10

| TAKE A NOTE |
|---|
| 7:15 am<br>Friday<br>August 5<br><br>BUY AIRLINE TICKETS FOR<br>MARLISE'S PARENTS |

ABOVE-LOCK NOTES

FIELD

The present application relates to note capture, and, particularly, to capturing notes in a mobile device.

BACKGROUND

Mobile devices often have a locked mode to prevent accidental or unauthorized access to the device. Typically, the locked mode displays limited information (e.g., date, time, etc.) and prevents the user from accessing applications (often called the lock screen). In one simple example, the user must perform a predetermined finger swipe to switch the phone from the locked mode to an unlocked mode. Depending on the user configuration, an additional password can be required to unlock the mobile device. In the unlocked state, the user typically has access to full functionality. The terms "above-lock" and "below-lock" are used to describe these different states. For example, above-lock describes a state wherein a majority of the applications are not accessible to a user as a result of the device being in a locked state. Likewise, below-lock means that a device is in a state wherein the majority of applications are accessible to the user. For example, in the below-lock state, a main screen (also called home or start screen) is displayed that shows a plurality of icons associated with applications. If the mobile device is not used for a predetermined time period, it can automatically switch back from the below-lock to above-lock state and display the lock screen when the user attempts to use the phone again.

It is a common scenario to use a mobile phone to capture note content that the user wishes to remember (i.e. a grocery list, a reminder, a photo of something important, or an audio note-to-self). Creating the digital equivalent of a post-it note or reminder can be more time-consuming and complex on a mobile phone than with pen and paper. To complete a note-taking task via conventional methods on a phone requires several steps, some of which include—but are not limited to—proceeding past the lock screen, navigation to the launch point for an application, launching the application, and starting a new note. Research shows that users are often deterred from quick note taking due to the number of steps and will instead try to remember their note without the help of software, or use paper instead.

Even when a user takes the time to capture a note on their mobile device, there is not an effective way to quickly view the note or be reminded to look at notes. This is a limitation on the usefulness of notes because users are required to remember important notes and/or take multiple steps to resurface them.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A note-capture application is disclosed that allows notes to be displayed on the lock screen. In one embodiment, a note-capture application can be invoked when a mobile device is in an above-lock state. Note data can be captured using the note-capture application, and the captured data can be persistently displayed on the lock screen.

A user can perform a unique gesture from the lock screen to invoke the note-capture application. Such a gesture can be "eyes free" as it can be a single user action or gesture, such as a finger swipe, that does not require the user to look at the screen.

In another embodiment, multiple input modes can be available for note data capture. For example, voice, text, and camera data (still images or video) can all be used to capture notes for display on the lock screen. Virtually any input method can be used.

The capture, which can be performed in any modality (e.g., voice, video, text) above the lock with a simple gesture or key store, allows for quick access to delivering data to be stored above-lock and for quick retrieval of such data.

The foregoing and other objects, features, and advantages of the invention will become more apparent from the following detailed description, which proceeds with reference to the accompanying figures.

BRIEF DESCRIPTION OF THE DRAWINGS

FIG. 10 is an exemplary lock screen with a user note displayed thereon.

DETAILED DESCRIPTION

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

Figure 1:
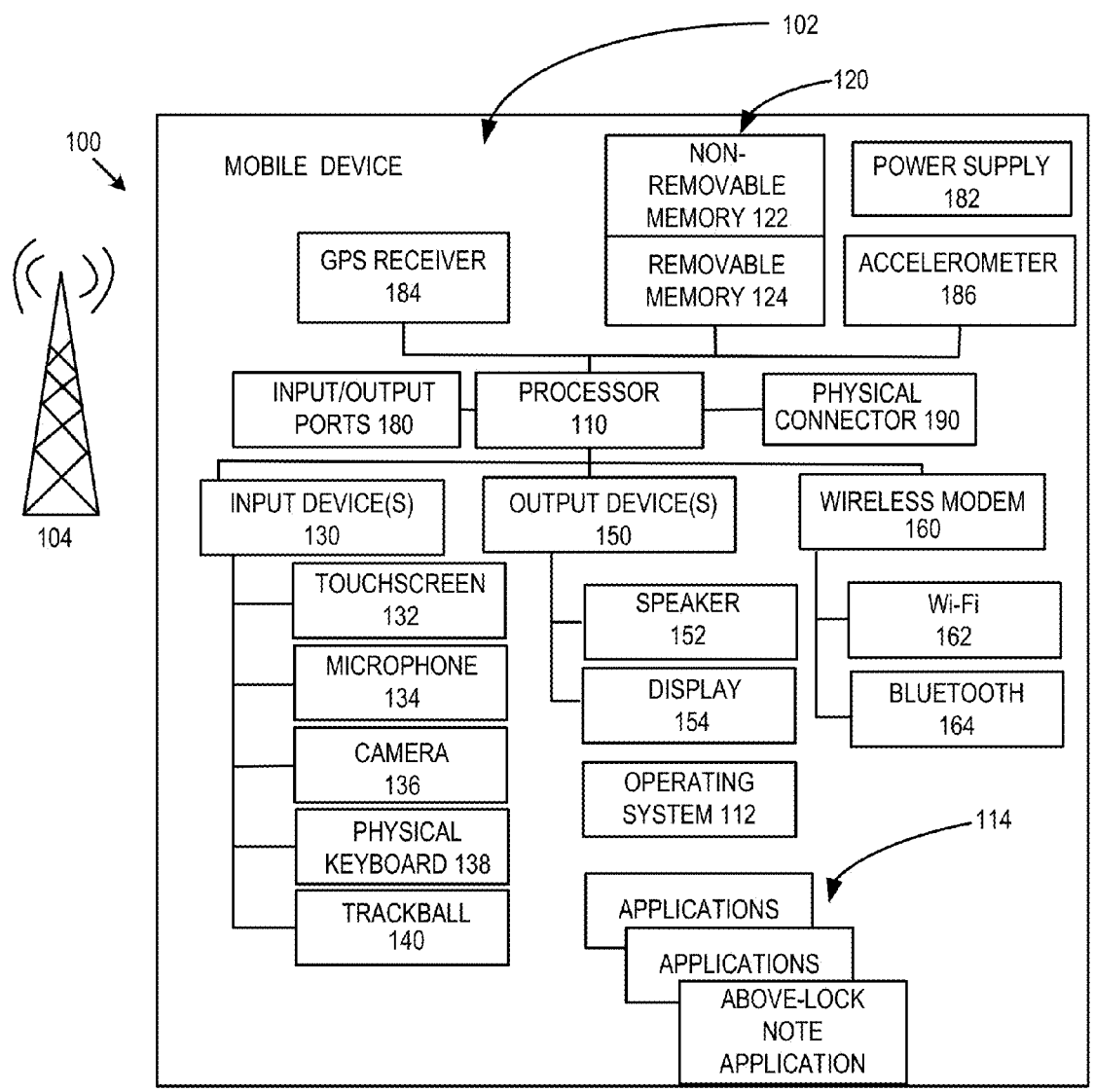
FIG. 1 is an exemplary mobile device having an above-lock note application.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application. One example application shown is an above-lock note application that can be used in some embodiments described below.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device. The input devices 130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 112 or applications 114 can comprise speech-recognition software as part of a voice user interface that allows a user to operate the device 100 via voice commands. Further, the device 100 can comprise input devices and software that allows for user interaction via a user's spatial gestures, such as detecting and interpreting gestures to provide input to a gaming application.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added.

Figure 2:
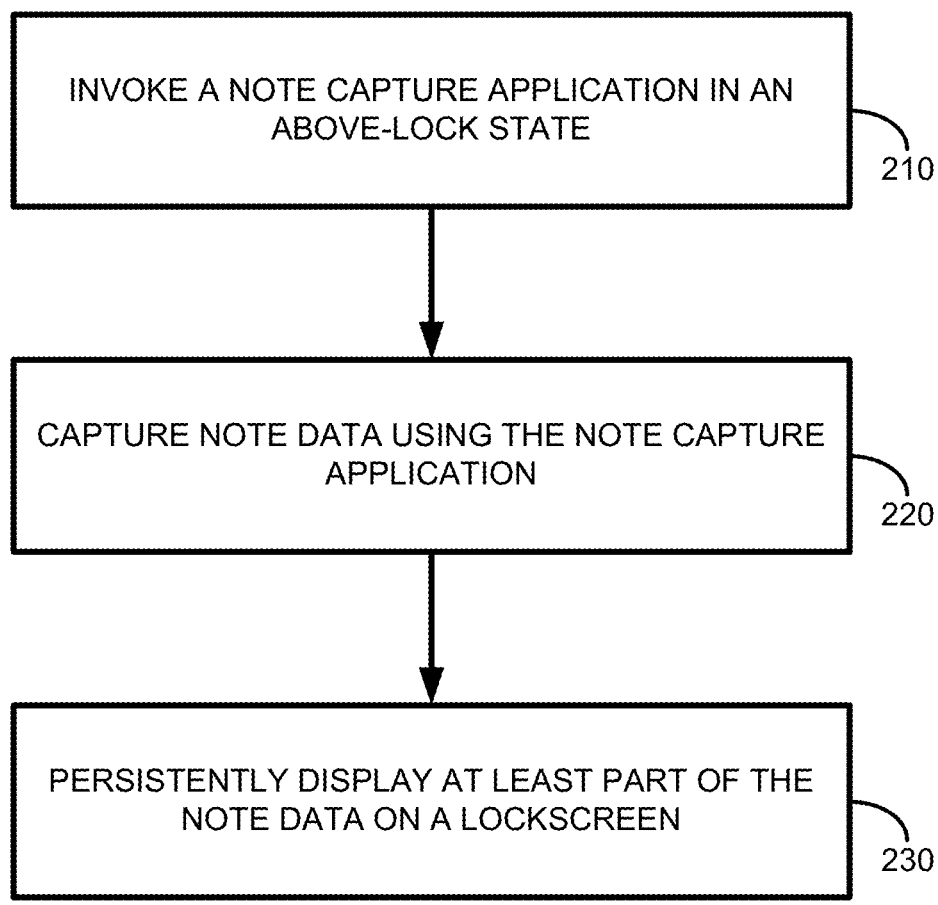
FIG. 2 is a flowchart of a method for capturing note data above-lock.

FIG. 2 is a flowchart of a method for persistently displaying note data on a lock screen. As is well understood in the art, a lock screen on a mobile device, is a display that appears when a user first powers up the mobile device or when the mobile device wakes up from a sleep mode. The lock screen can have some information displayed, such as cellular signal strength, wi-fi indicator, time and date information, etc. Typically, from the lock screen (which is an above-lock state), the user is not able to access the majority of applications available. In process block 210, a note capture application can be invoked in an above-lock state. Invoking the application means that the application is launched or becomes active (i.e., the application with the focus). In process block 220, note data can be captured using the note capture application. As described further below, there are a variety of input mechanisms for capturing data, such as text entry, sketch, voice entry, camera photos, video, etc. In process block 230, at least part of the note data, and sometimes all of the note data is persistently displayed on the lock screen. By being persistently displayed, it is meant that the note remains present on the lock screen until such time as it is deleted or expires. Thus, even after the device is powered off and back on, or if the device enters a sleep mode and then wakes up from the sleep mode, the note data is displayed on the lock screen. The note data can be less than a threshold length or number of characters, and, if the threshold is exceeded, only a part of the note data can be viewed from the lock screen. The remaining note data can be accessed for viewing through the note capture application. By providing access to the note data above-lock, the data is easily captured and retrieved on demand.

Figure 3:
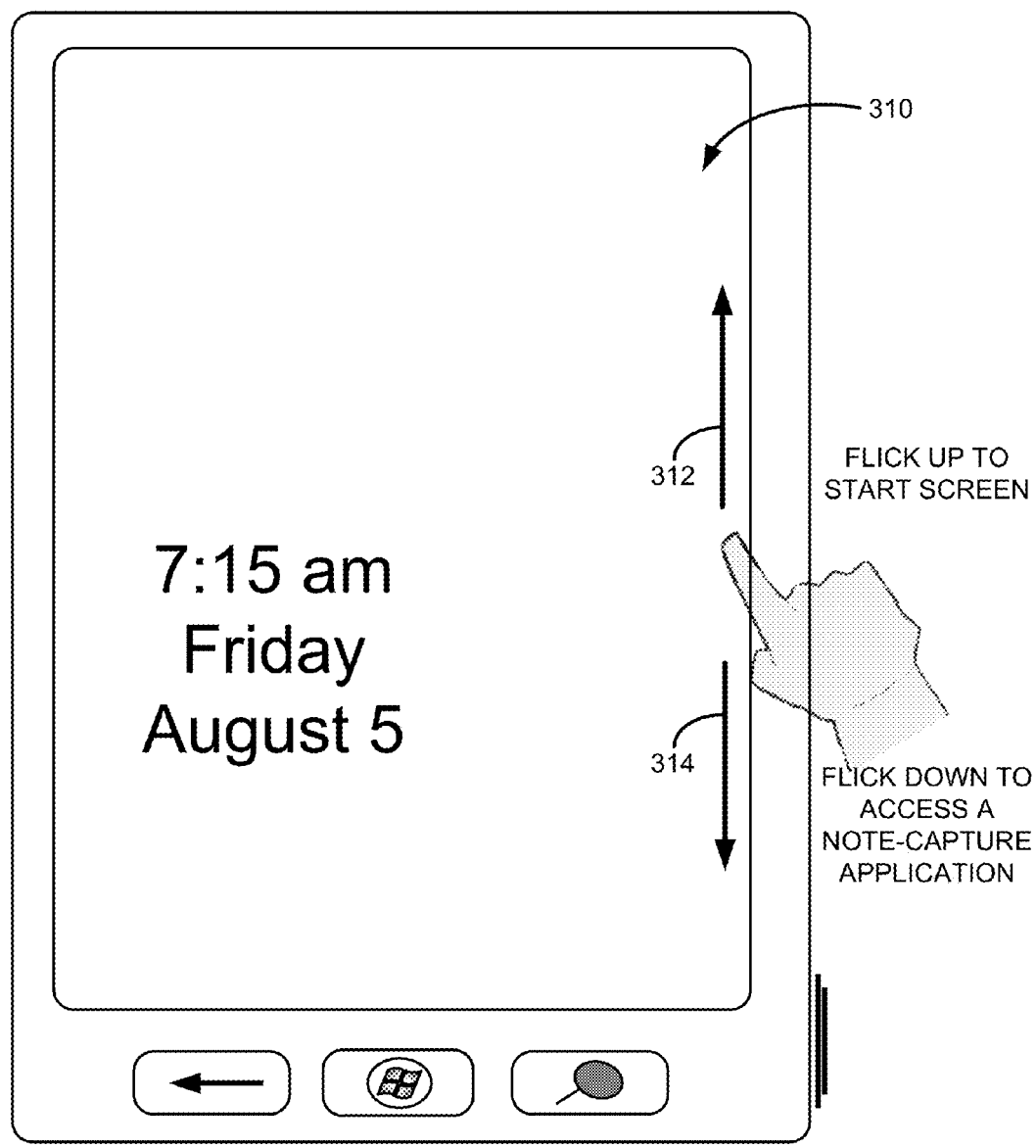
FIG. 3 is an exemplary lock screen showing different user operations that can be performed.

FIG. 3 is an exemplary lock screen 310, wherein time and date information is displayed. Typically, a plurality of applications cannot be viewed from the lock screen, and the main functionality cannot be accessed. For most mobile devices, a flick operation in a first direction can unlock the mobile device. For example, FIG. 3 shows an example user flicking in a direction as shown by arrow 312. In the present embodiment, a flick operation in a second direction, different than the first direction, allows a user to access a note application by putting the note application into focus or otherwise launching the note application. An exemplary second direction is shown by arrow 314.

Figure 4:
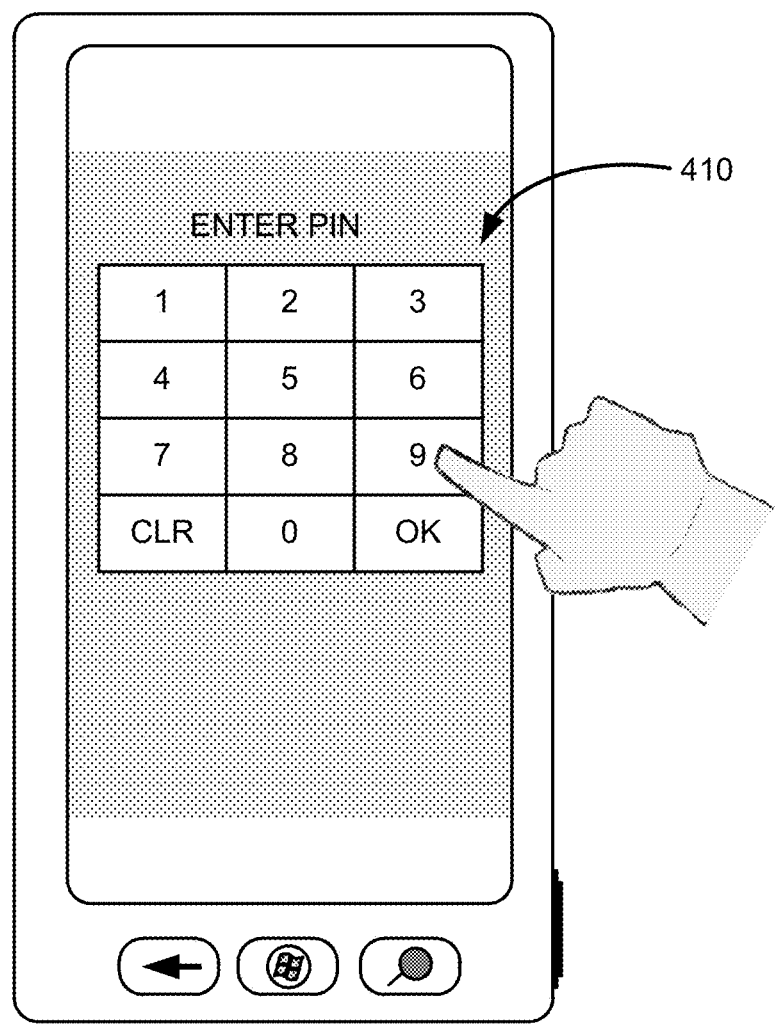
FIG. 4 shows an exemplary pin request after performing one of the user operations of FIG. 3

FIG. 4 depicts a mobile device 400 after the flick operation 312 is performed from FIG. 3. In response to the flick operation, an authentication screen 410 is displayed with a PIN pad for receiving a user pin code. Although the authentication screen shown in FIG. 4 uses a PIN pad, other techniques can be used, for example, fingerprint or voice recognition. The user can enter a PIN (e.g., a four-digit sequence of numerals). If the PIN entered matches a pre-selected PIN, the user is successfully authenticated, and the device can enter a below-lock (unlocked) state.

Figure 5:
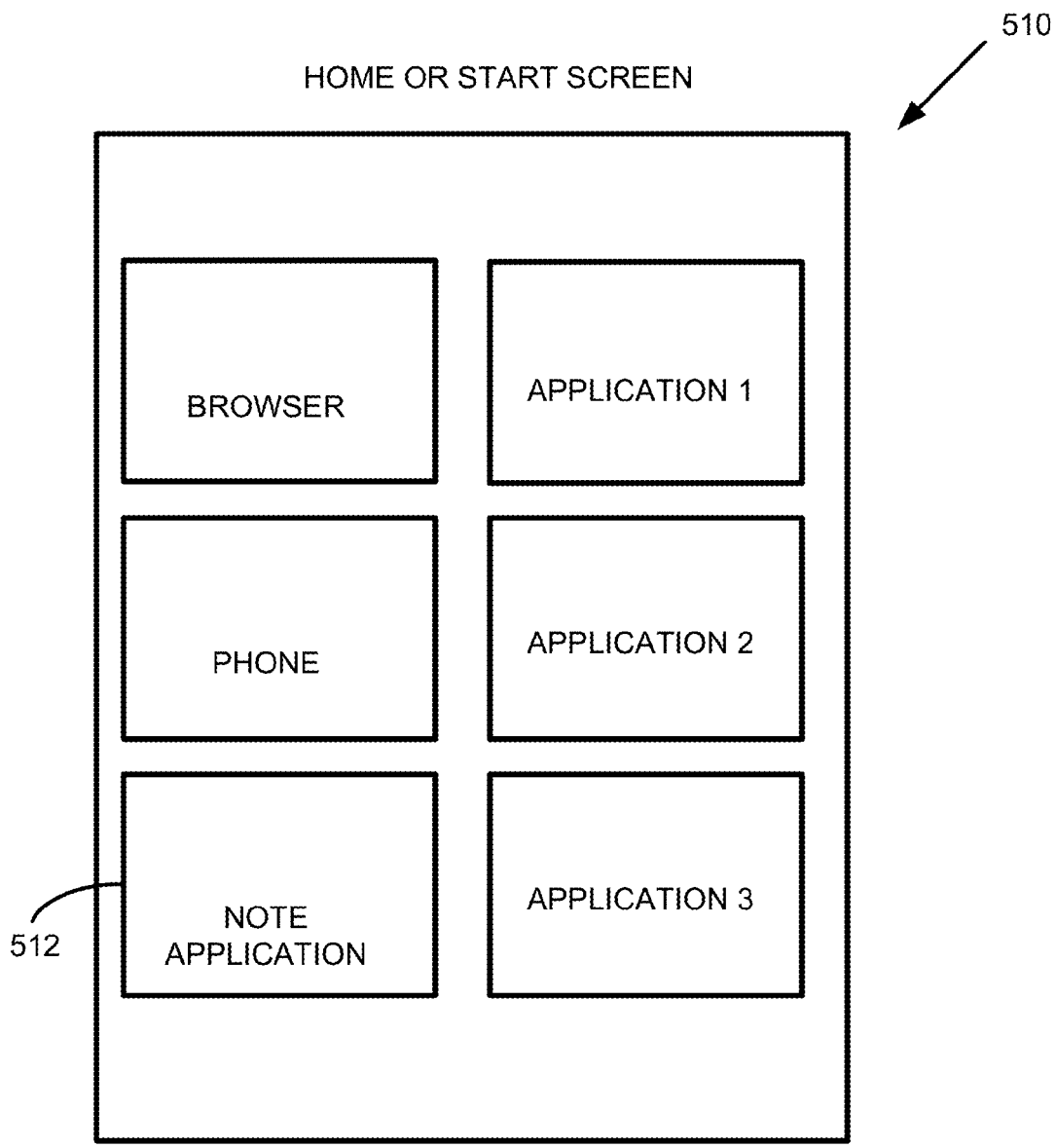
FIG. 5 shows an exemplary home screen that can be displayed after receiving a proper pin in FIG. 4, with a plurality of icons representing applications available on the mobile device.

FIG. 5 illustrates a first screen 510 typically displayed in the below-lock state. Most mobile devices call this first screen a "home" screen or a "start" screen. A plurality of icons representing applications is displayed. One application of interest is a note application 512 that allows a user to enter notes, as is well understood in the art.

Figure 6:
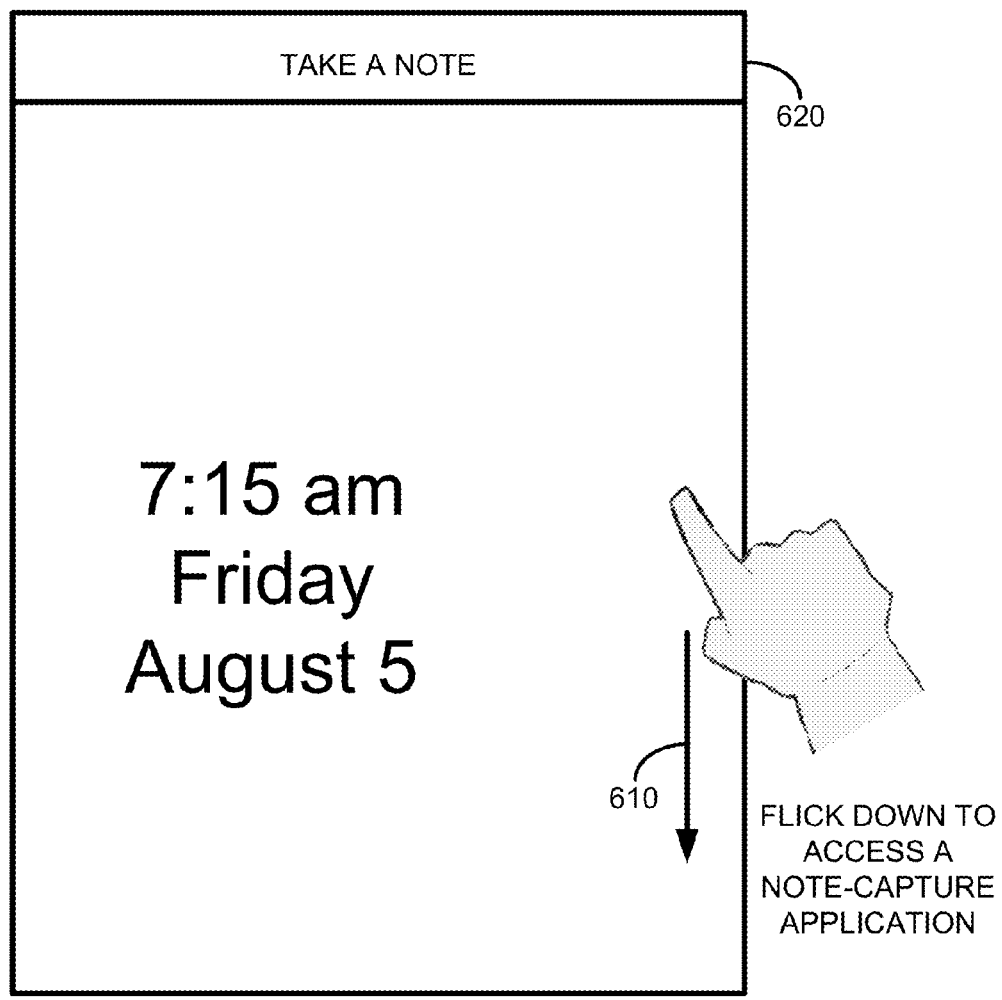
FIG. 6 shows an exemplary technique for accessing a note application from an above-lock state.

FIG. 6 illustrates an embodiment wherein a user flicks the lock screen in a direction different than the direction used to unlock, as shown by the arrow 610. As shown at 620, a note-capture application is invoked from the lock screen while the mobile device is in the above-lock state. However, most or all of the applications shown in FIG. 5 on the home screen are not accessible above lock. The note application, below lock, can have additional functionality, such as email, longer message lengths, a large number of potential notes, etc.

Figure 7:
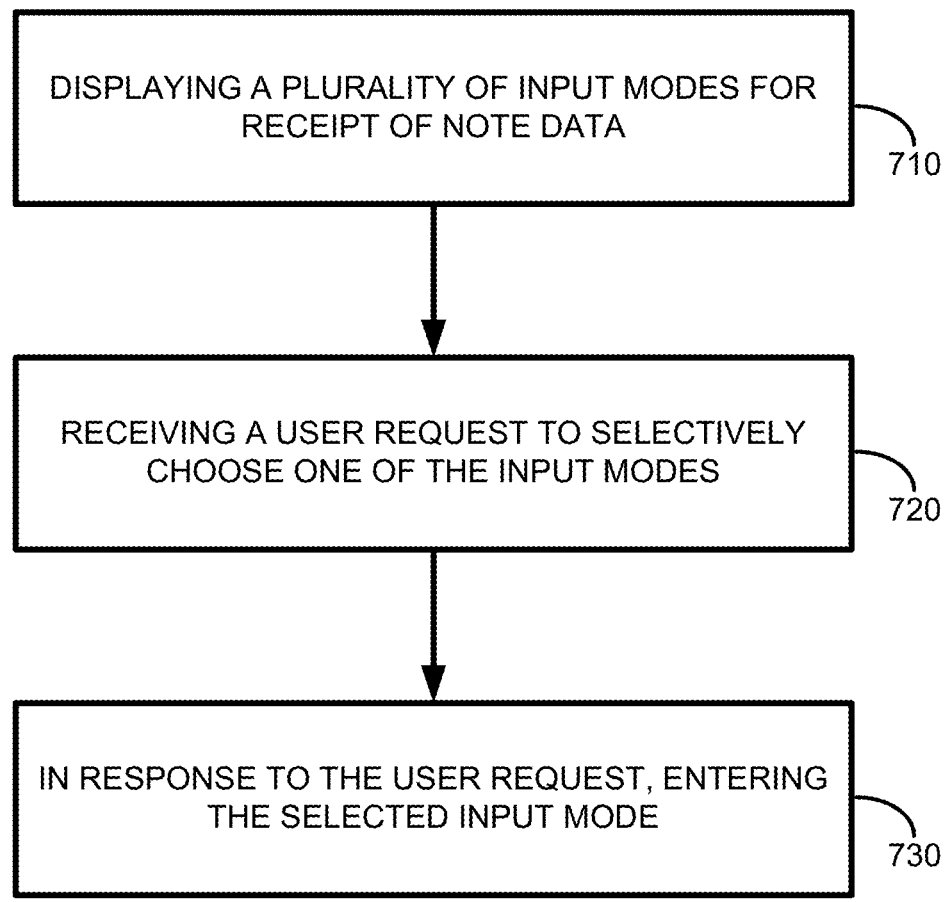
FIG. 7 is an exemplary flowchart of a method for providing multiple input modes for entering notes.

FIG. 7 is a flowchart of a method for entering a data input mode. In process block 710, when the note-capture application is invoked, a plurality of input modes is displayed for receipt of note data. In process block 720, a user can select one of the input modes as a desired input mode. Example input modes include voice, text, sketch, camera, etc. Additional input modes can be used. In process block 730, in response to the user request, the desired input mode can be entered. Once the input mode is entered, the user can enter the note data to be captured. In this way, a user can selectively choose one of a plurality of input modes for capturing note data.

Figure 8A:
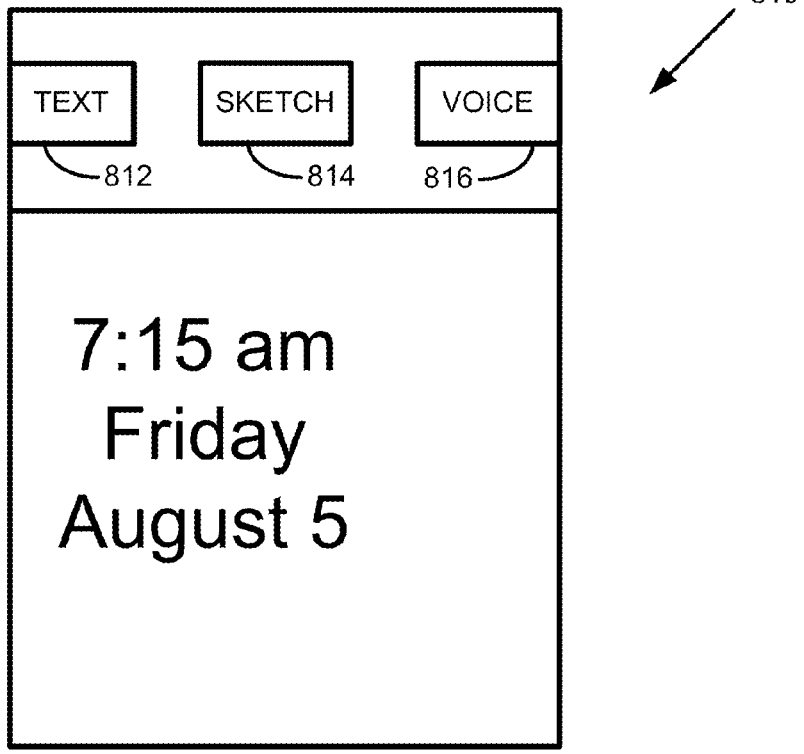
FIGS. 8A and 8B show exemplary options for entering one of multiple input modes for entering notes.
Figure 8B:
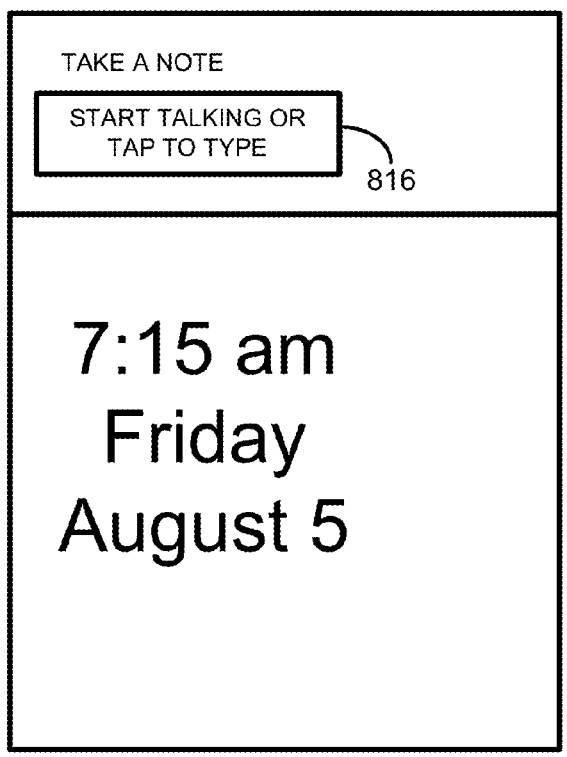

FIGS. 8A and 8B show example user interfaces for entering note data. In FIG. 8A, a plurality of user buttons 810 are displayed, including a text button 812, a sketch button 814, and a voice button 816. The user can selectively choose between these various input modes. If the text button 812 is selected, a keyboard (not shown) can be displayed for capturing the note data. If the sketch button is selected, the user interface can be cleared of text so that the user can enter the sketch using a finger or stylus. If the voice button 816 is selected, the user can begin speaking to capture data. Other buttons can be used. FIG. 8B illustrates an alternative wherein if the user begins to speak, the voice input mode is automatically entered without any further user interaction with the touch screen. If the user instead prefers to type text, button 816 can be selected to automatically display a keyboard.

Thus, using the automatic voice input, the user can enter the persistent note data to the lock screen with a single user gesture (e.g., a flick gesture).

Figure 9:
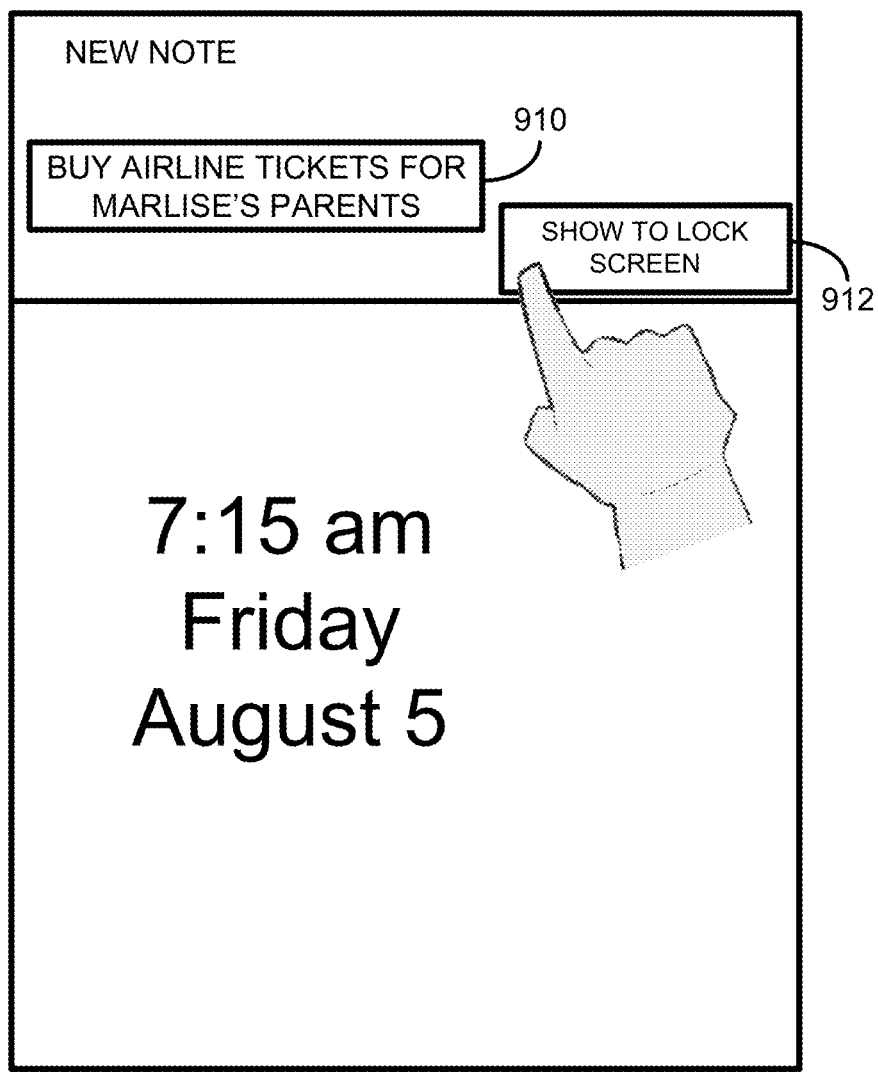
FIG. 9 is an exemplary view of a note application wherein the user selectively displays the note on the lock screen.

FIG. 9 shows an exemplary user interface screen wherein the note data 910 is completed. The exemplary note data was entered using voice or text. The user can then selectively control that the note data be displayed on the lock screen through selection of button 912.

FIG. 10 shows the note data at 1010 persistently displayed on the lock screen. As such, the note data can remain displayed every time the lock screen is displayed, which is typically when the mobile device is powered on or woken up from a sleep mode.

Figure 11:
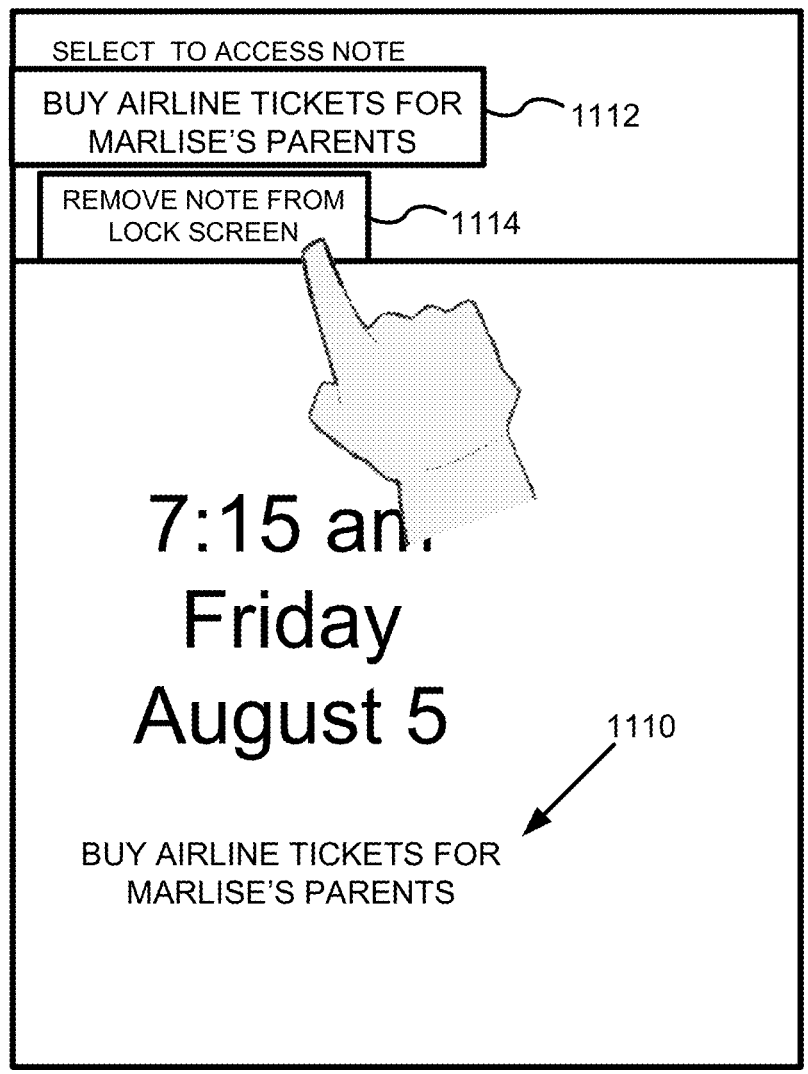
FIG. 11 is an exemplary view of how to delete the note from the lock screen.

FIG. 11 shows another exemplary user interface screen wherein the user can remove or delete the note data from the lock screen. When a user invokes the note-capture application when a note already is being displayed on the lock screen, as shown at 1110, then the note can be displayed again in the note application as shown at 1112. The user can then delete or remove the note from the lock screen by selecting button 1114. Alternatively, the user can select the displayed note data 1112 to view further information about the note data. In one example, the note data displayed on the lock screen is only part of the note because the note exceeded a predetermined length. To view the entire note, the user can select the note. Other information associated with the note can also be displayed (e.g., calendar information, contact information, etc.)

Figure 12:
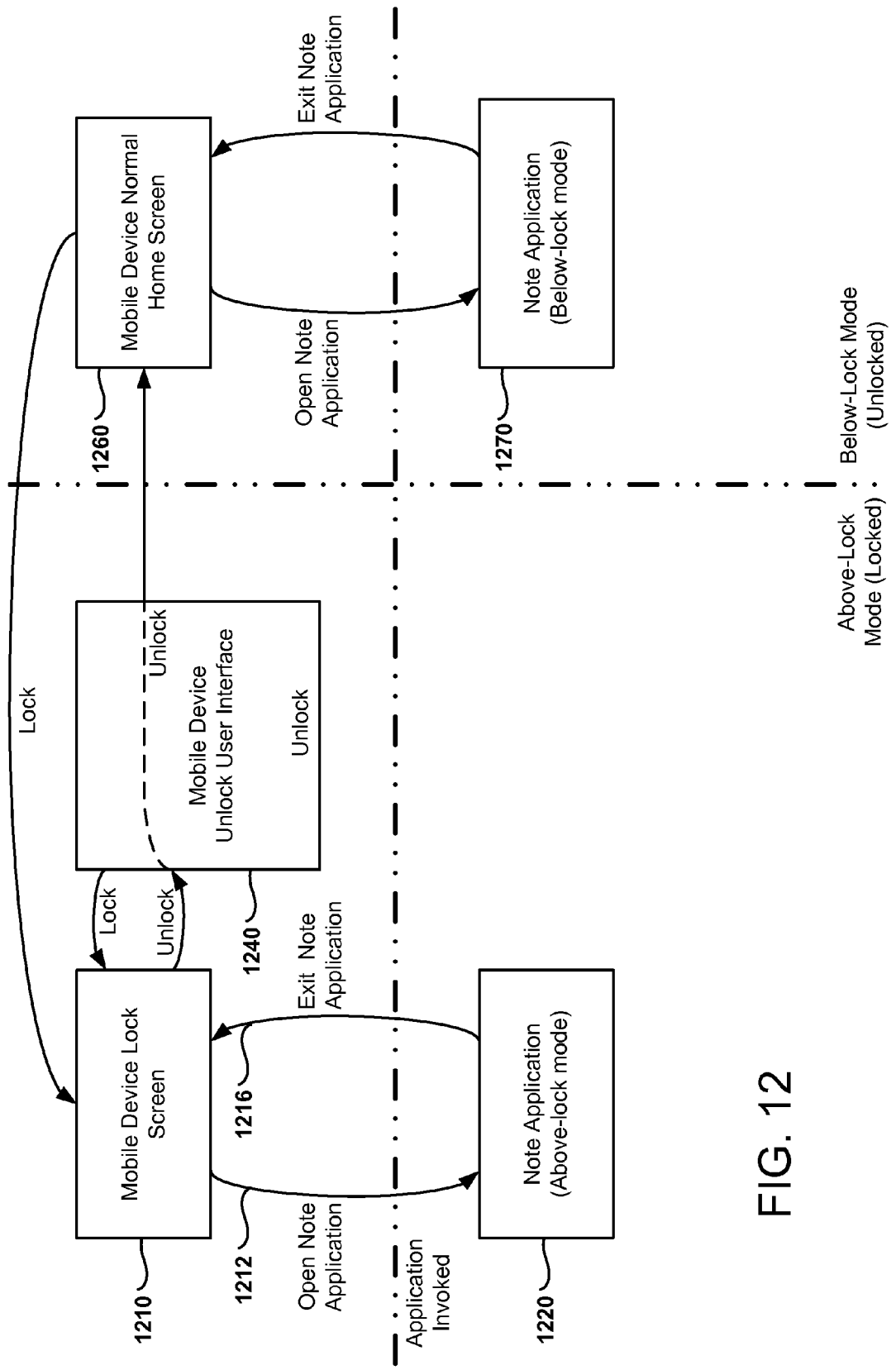
FIG. 12 is an exemplary system level diagram showing above-lock and below-lock states.

FIG. 12 shows a system diagram with the relationship between above-lock and below-lock states. At lock screen state 1210, the mobile device is in an above-lock state. While at lock screen state 1210, the mobile device can exhibit multiple behaviors consistent with a lock screen, such as displaying a lock screen as shown in FIG. 3, displaying a blank screen or wallpaper, or powering off the mobile device display and/or other selected features or components (e.g., if the mobile device is in a standby state or a low-power state).

At transition 1212, input data is received requesting invocation of an application, for example, invocation of a note-capture application in an above-lock state. Several input methods for creating input data requesting invocation of an application, consistent with the goals of allowing fast access to a note-capture application while preventing unnecessary power consumption, are available, including the following examples.

A first option, involves a mobile device user pressing and holding a dedicated hardware button connected to the mobile device while the mobile device is in an above-lock mode for a predetermined time (e.g., for one second). The predetermined time is used to mitigate accidental launches of the note-capture application when the device is in, for example, a user's handbag or pocket. When the end-user presses and holds a note-capture application is launched and an area of the display is devoted to the application for user input.

A second option, involves a mobile device user pressing the predetermined button while the mobile device is in an above-lock mode, after which the mobile device presents a confirmation user interface on the screen requesting confirmation that the user actually intends to use the note-capture application. After receiving a successful confirmation, a note-capture application can be launched.

A third option, can be a single finger swipe, as already described above. As will be readily understood by a person of ordinary skill in the art, the three options are just examples and a wide variety of user interface techniques can be used for accessing the note-capture application. Regardless of the input method used, after receiving input data requesting invocation of an application, the mobile device enters state 1220, an above-lock note-capture mode. If the device is in a standby, sleep, or other low-power mode, the mobile device is also waked from that state before launching the application. While in note-capture mode, the user is presented with only a subset of the full functionality of a below-lock note application, shown at 1270. For example, the note application 1270 may allow for multiple pages of notes, emailing of notes, etc., while the note application 1220 may only allow a single note to be captured. In some embodiments, the note application 1220, above-lock, can be an entirely different application than the below-lock application 1270. The device can also transition 1216 back to the lock screen state 1210 if, for example, the device does not receive input after a specified time period, or the user presses a designated key (e.g., the power button).

At state 1220, if input data is received, then the mobile device captures the note data and displays the captured note data on the lock screen. The note-capture application can allow selective acceptance by the user of a completed note.

At state 1240, the mobile device presents an unlock user interface to the user. For example, the user might be prompted to enter a PIN number using the mobile device touch screen, press a key combination (such as "Unlock" and "*"), or provide a finger print or voice recognition. If the mobile device successfully authenticates a user, then the device state changes to below-lock mode, and the device transitions to the mobile device normal home screen at state 1260.

In some examples, the mobile device also includes a timeout period (e.g., one minute) for one or more of the above-lock states 1210, 1220, and 1240. If the mobile device does not detect user activity before the timeout period expires, the device transitions back to the locked and/or sleep state (or other low-power state). At state 1260, the user has transitioned from the mobile device unlock user interface state 1240 and is presented with a top-level home screen for the device. That is, a user at state 1260 can invoke mobile device applications, such as a below-lock note application 1270.

Figure 13:
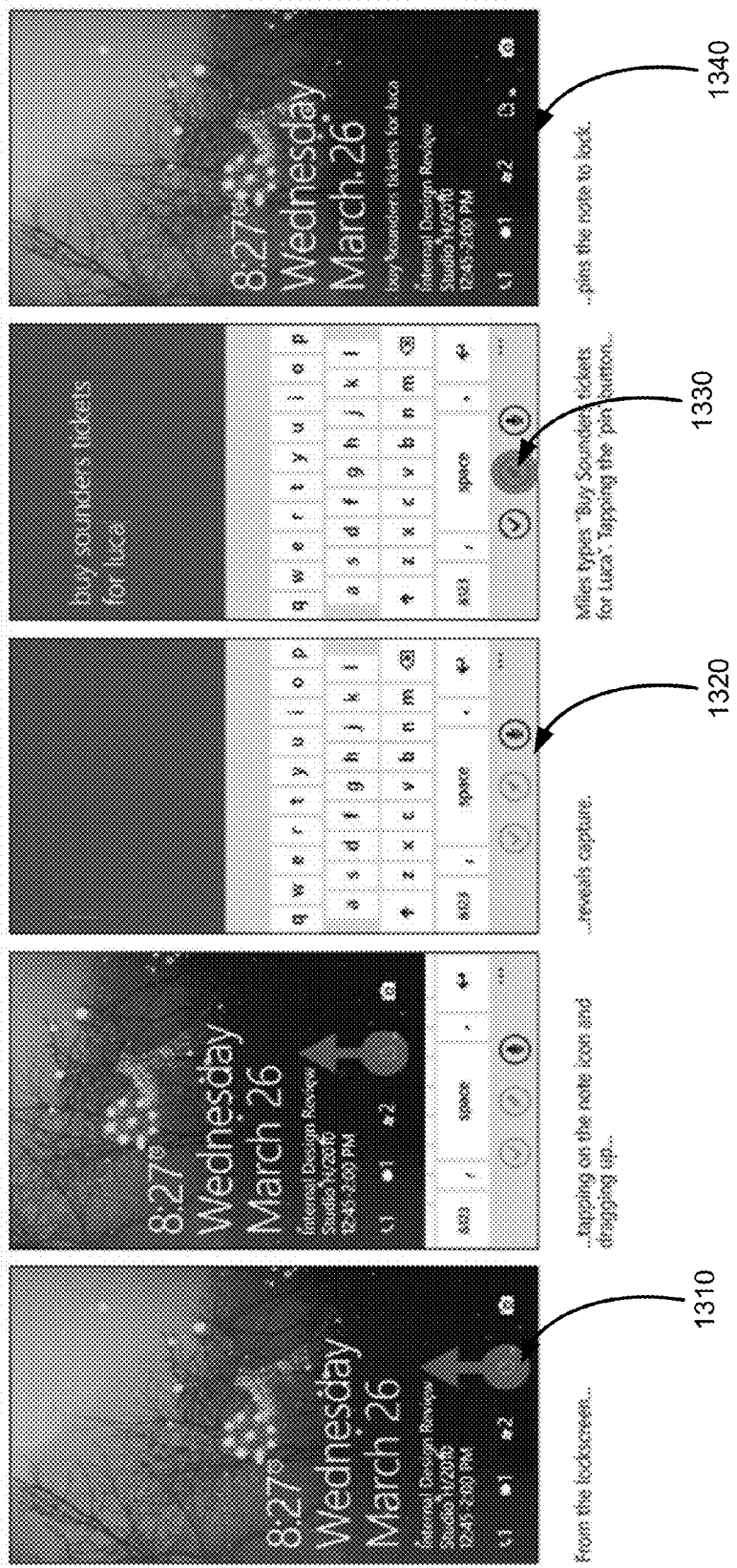
FIG. 13 illustrates another example of how to access a note application from an above-lock state.

FIG. 13 shows another series of examples of a user interface design. In this example, a note icon 1310 is displayed on the lock screen. A press on the note icon together with a flick upward, as indicated by the arrow, results in a capture area 1320 to be exposed. After a note is entered, a pin button 1330 can be selected to pin the note to the lock screen as shown in image 1340.

Figure 14:
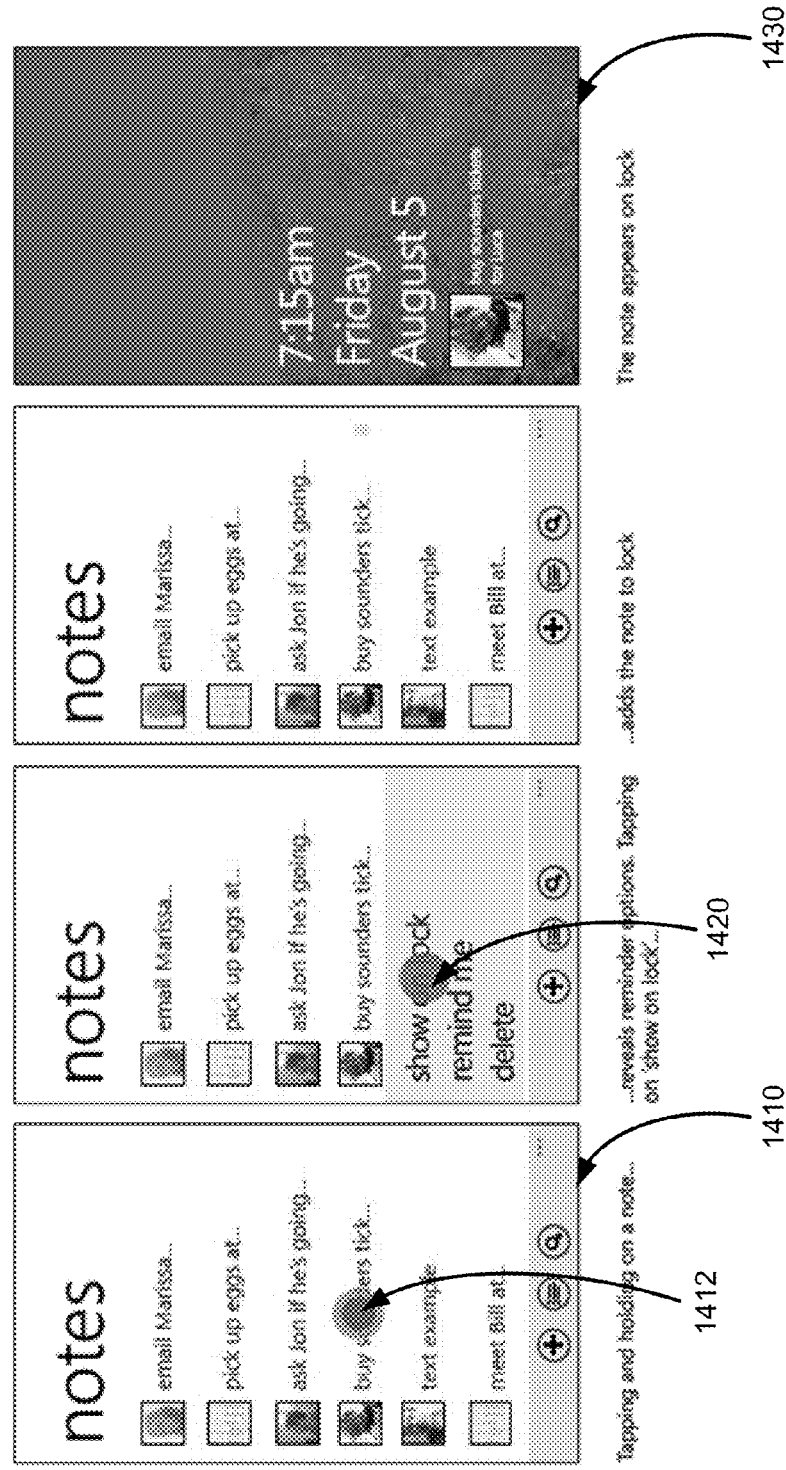
FIG. 14 illustrates how to add a note from a below-lock state to a lock screen.

FIG. 14 shows a below-lock application 1410 including a plurality of notes. A user can select one of the notes, as shown at 1412, using a tap-and-hold operation. In response, a list of menu items can be displayed, shown at 1420, and the user can select an option to show the note above lock. When the user makes such a selection, the note is pinned to the lock screen as shown at 1430. Thus, below-lock applications can also have an option to pin a note above lock for display on the lock screen.

Figure 15:
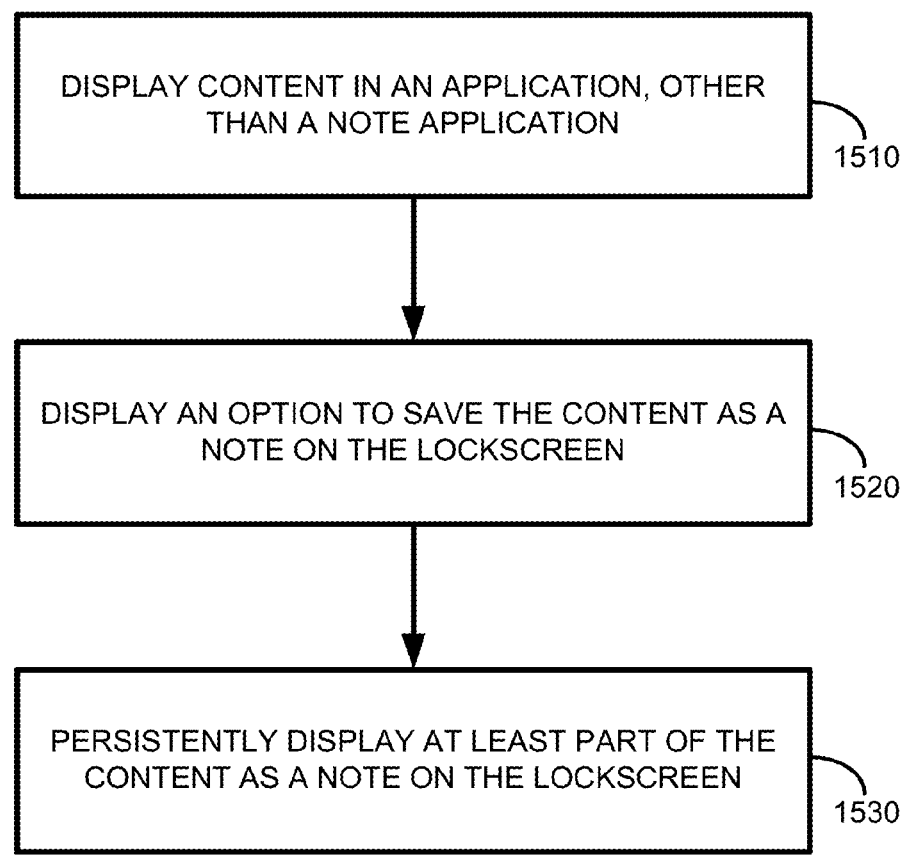
FIG. 15 is a flowchart of a method of adding a note to a lock screen from an application, other than a note application.

FIG. 15 is an exemplary flow chart of a method for capturing note data. In process block 1510, content is displayed in an application, other than a note application. Example applications can include browsers, word processing, spreadsheets, etc. In process block 1520, a menu option can be offered to pin the content as a note on the lock screen. In response to selecting the pin option, at least a portion of the content is persistently displayed on the lock screen (process block 1530).

Figure 16:
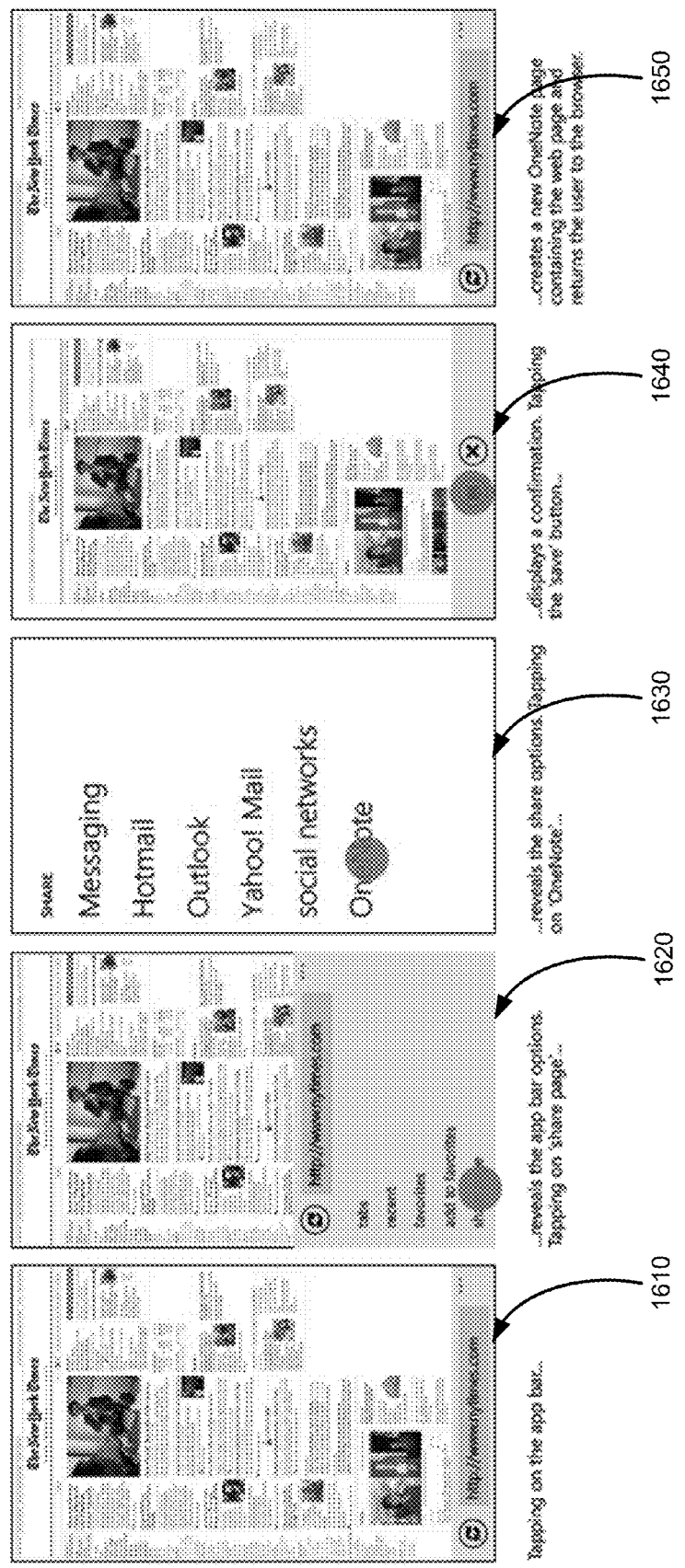
FIG. 16 illustrates adding a note to the lock screen from a browser application.

FIG. 16 shows an example of a browser application that is below lock, and that includes a menu option for pinning content to the lock screen. In 1610, content is displayed that is obtained from a website. At 1620, a menu is displayed allowing sharing of the web page. At 1630, the above-lock note application is selected. At 1640, a confirmation is requested, and, upon user selection, the content, or a portion thereof, is displayed on the lock screen. At 1650, the user is returned to the browser.

Figure 17:
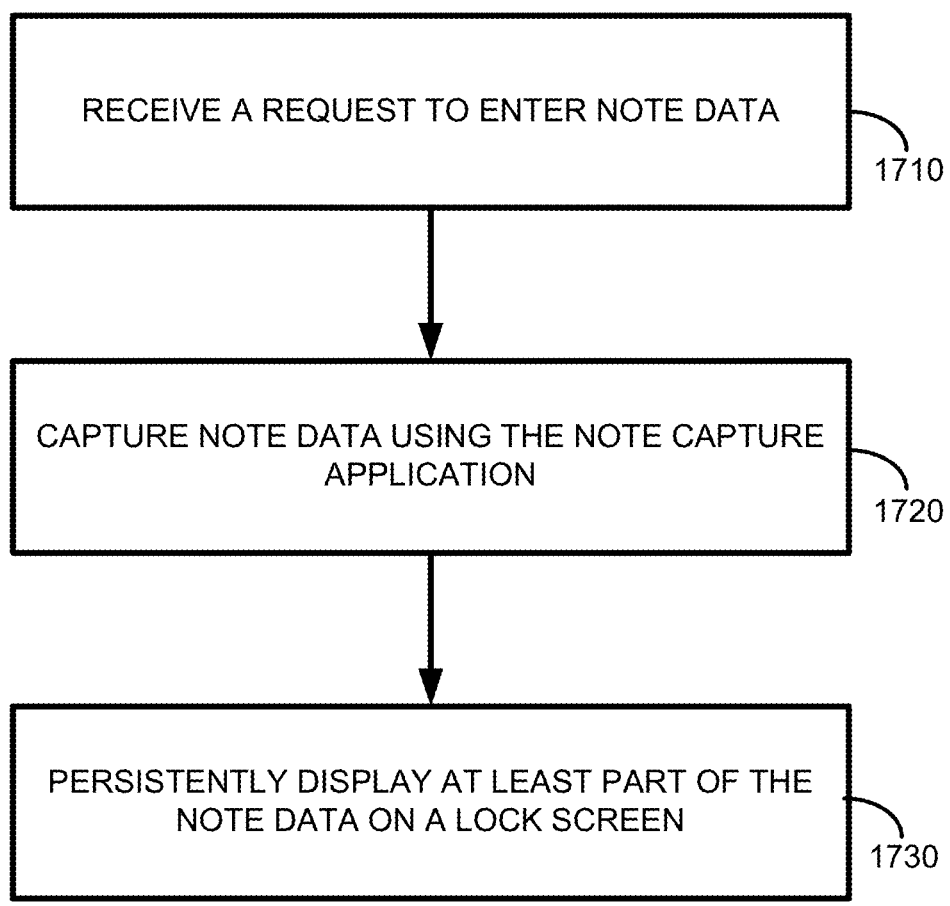
FIG. 17 is another flowchart of an embodiment for adding a note to a lock screen.

FIG. 17 is a flowchart of a method for capturing note data according to another embodiment. In process block 1710, a request is received for capturing note data. For example, the user can invoke a note application, as already described. In process block 1720, note data is captured using a note capture application. In process block 1730, the note data is persistently displayed on the lock screen.

Figure 18:
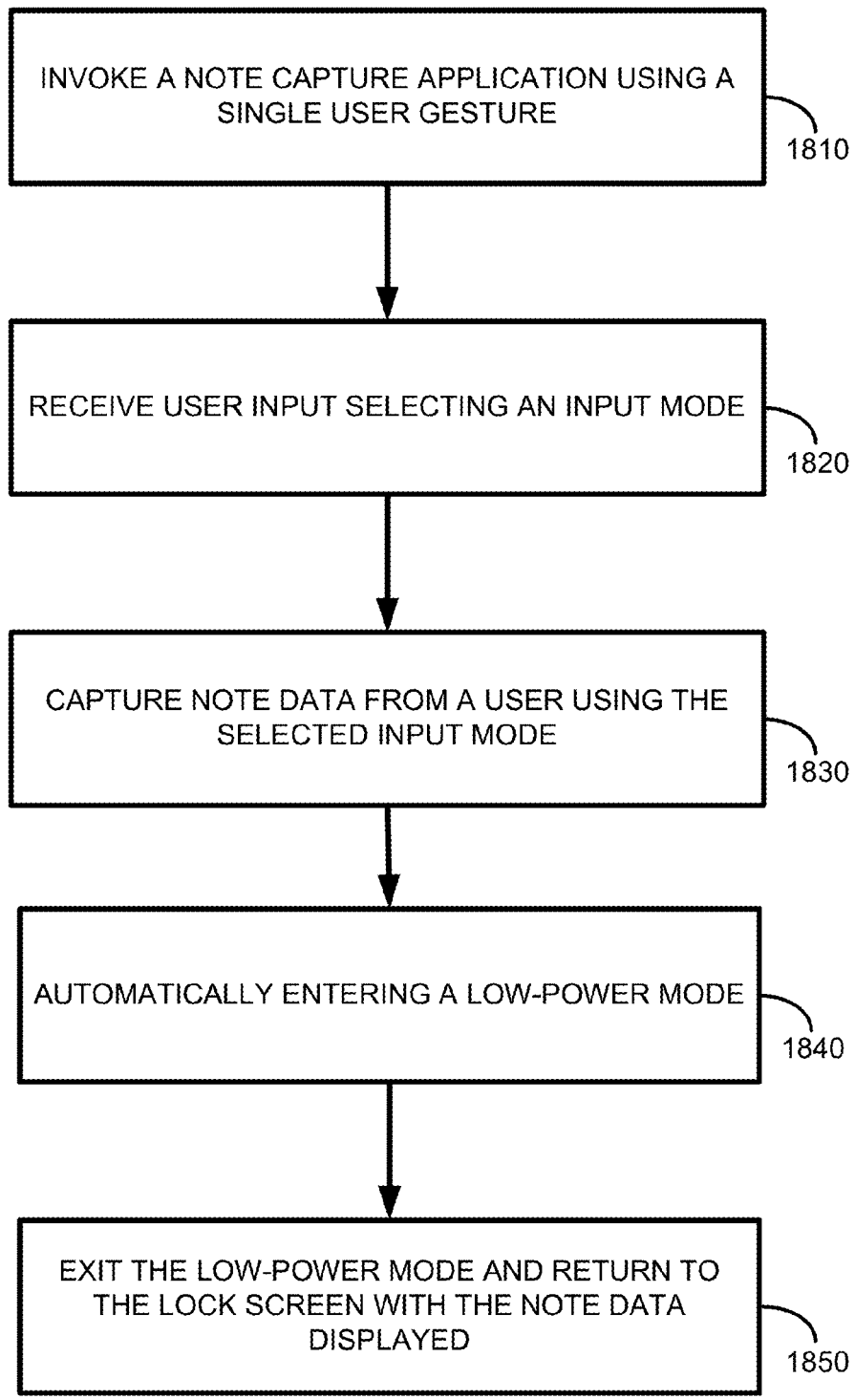
FIG. 18 is a detailed flowchart of an embodiment for adding a note to a lock screen.

FIG. 18 is a flowchart of a method according to another embodiment. In process block 1810, a note capture application is accessed using a single user gesture from a lock screen. In process block 1820, user input is received to select an input mode for capturing data. In process block 1830, the note data is captured using the selected input mode. In process block 1840, a low-power mode is automatically entered after a predetermined period of nonuse. In process block 1850, after exiting a low-power mode, the mobile device displays a lock screen with the note data displayed.

Figure 19:
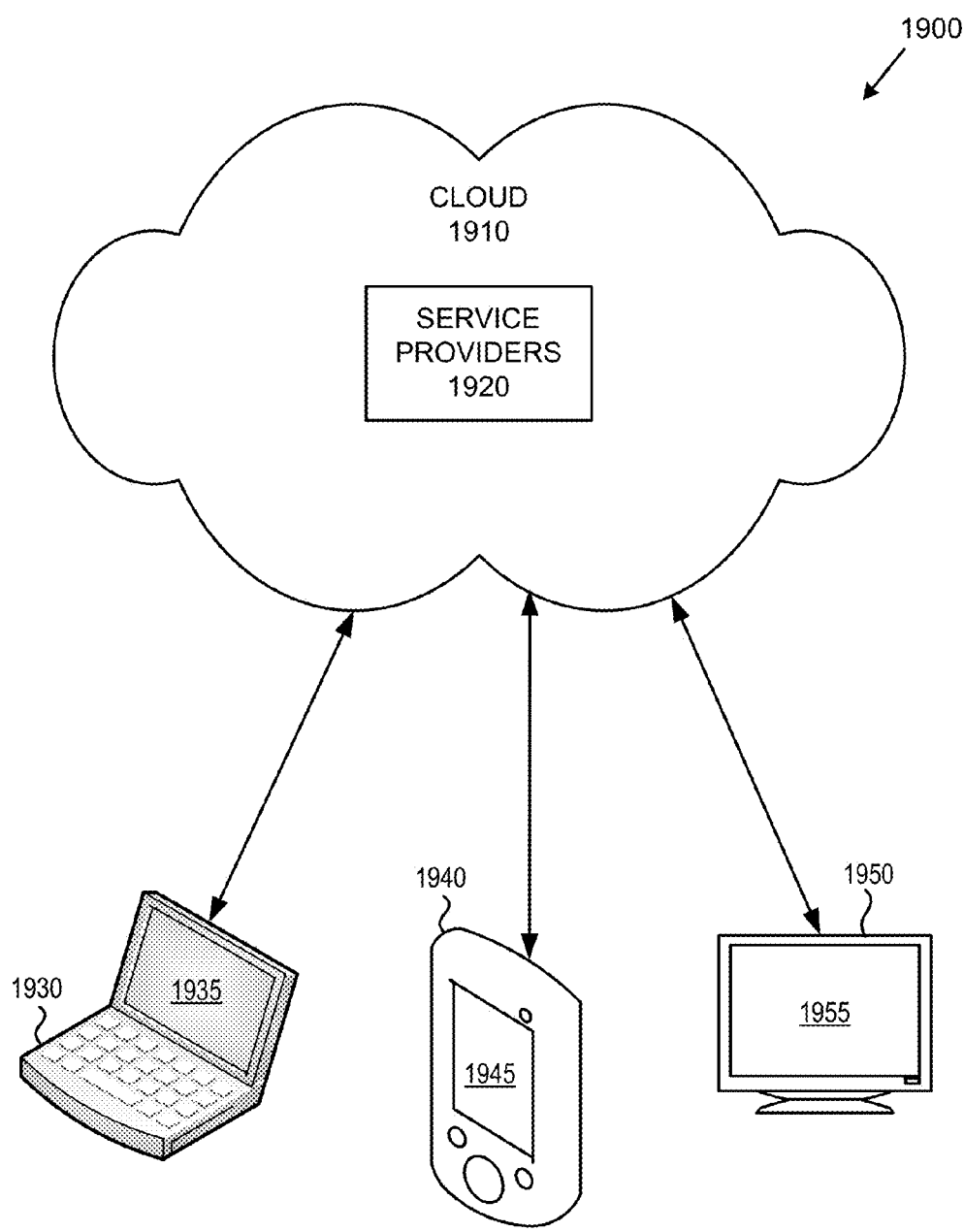
FIG. 19 is a system level diagram showing that note data can be shared across user devices.

FIG. 19 illustrates a generalized example of a suitable implementation environment 1900 in which described embodiments, techniques, and technologies may be implemented.

In example environment 1900, various types of services (e.g., computing services) are provided by a cloud 1910. For example, the cloud 1910 can comprise a collection of computing devices, which may be located centrally or distributed, that provide cloud-based services to various types of users and devices connected via a network such as the Internet. The implementation environment 1900 can be used in different ways to accomplish computing tasks. For example, some tasks (e.g., processing user input and presenting a user interface) can be performed on local computing devices (e.g., connected devices 1930, 1940, 1950) while other tasks (e.g., storage of data to be used in subsequent processing) can be performed in the cloud 1910.

In example environment 1900, the cloud 1910 provides services for connected devices 1930, 1940, 1950 with a variety of screen capabilities. Connected device 1930 represents a device with a computer screen 1935 (e.g., a mid-size screen). For example, connected device 1930 could be a personal computer such as desktop computer, laptop, notebook, netbook, or the like. Connected device 1940 represents a device with a mobile device screen 1945 (e.g., a small size screen). For example, connected device 1940 could be a mobile phone, smart phone, personal digital assistant, tablet computer, or the like. Connected device 1950 represents a device with a large screen 1955. For example, connected device 1950 could be a television screen (e.g., a smart television) or another device connected to a television (e.g., a set-top box or gaming console) or the like. One or more of the connected devices 1930, 1940, 1950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1900. For example, the cloud 1910 can provide services for one or more computers (e.g., server computers) without displays.

Services can be provided by the cloud 1910 through service providers 1920, or through other providers of online services (not depicted). For example, cloud services can be customized to the screen size, display capability, and/or touchscreen capability of a particular connected device (e.g., connected devices 1930, 1940, 1950). Embodiments described herein for note data can be used on any of the device 1930, 1940, 1950. Additionally, the note data can be pinned across devices, such that a pin to a lock screen on one device type, automatically generates a command through cloud 1910 to pin to other of the devices.

In example environment 1900, the cloud 1910 provides the technologies and solutions described herein to the various connected devices 1930, 1940, 1950 using, at least in part, the service providers 1920. For example, the service providers 1920 can provide a centralized solution for various cloud-based services. The service providers 1920 can manage service subscriptions for users and/or devices (e.g., for the connected devices 1930, 1940, 1950 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of operating a mobile device having an above-lock state and a below-lock state, the method comprising:
   invoking a note-capture application when the mobile device is in the above-lock state;
   capturing note data from a user using the note-capture application with the mobile device in the above-lock state, wherein capturing note data includes receiving a new note in the above-lock state; and
   in the above-lock state, persistently displaying at least a part of the note data on a lock screen until receiving a user request to remove the note data;
   wherein the at least the part of the note data is a portion of the new note that has not exceeded a predetermined length and in response to receiving a selection of the note data, displaying an entirety of the new note.

2. The method of claim 1, further including, in the above-lock state, selectively displaying the entire captured note data in response to a user request to view the note data.

3. The method of claim 1, wherein the note data is displayed on the lock screen when the mobile device exits a low-power mode.

4. The method of claim 1, further including, in the above-lock state, receiving a user request to selectively choose one of a plurality of input modes for capturing the note data.

5. The method of claim 4, wherein the input modes include speech or text inputs.

6. The method of claim 4, further including receiving a user selection of a text input mode and automatically displaying a keyboard in response thereto.

7. The method of claim 1, further including switching from the above-lock state to a below-lock state in response to a user input command, wherein in the above-lock state, a majority of applications on the mobile device are not accessible to a user.

8. The method of claim 1, wherein the mobile device is a mobile phone.

9. The method of claim 1, further including receiving user input to remove the persistently displayed note data from the lock screen.

10. A computer readable storage having instructions thereon for executing a method of capturing a note using a mobile device, the method comprising:
- receiving a request to enter note data into a note-capture application;
- capturing note data using the note-capture application, wherein capturing note data includes taking a new note in an above-lock state; and
- persistently displaying at least a first part of the note data on the lock screen in the above-lock state, wherein the first part of the note data is below a predetermined length and in response to receiving a selection of the note data, displaying at least a second part of the note data and additional calendar or contact information associated with the note data.

11. The method of claim 10, wherein the lock screen prevents access to a majority of applications stored on the mobile device.

12. The method of claim 10, wherein persistently displaying at least a part of the note data includes continuously displaying the at least partial note data whenever the lock screen is displayed until user input is received to remove the note data.

13. The method of claim 10, wherein the at least partial note data is displayed on the lock screen when the mobile device exits a low-power mode.

14. The method of claim 10, wherein receiving the request to enter note data includes receiving user selection between a plurality of input modes for entering note data while the mobile device is in an above-lock state.

15. The method of claim 10, wherein the received request is from the lock screen or from an application, other than a note application, in a below-lock state.

16. The method of claim 10, further including switching from the lock screen, which is an above-lock state to a below-lock state in response to a user password.

17. The method of claim 10, wherein the mobile device is a mobile phone.

18. A method of capturing note data on a mobile phone, comprising:
- from a lock screen that is displayed in an above-lock state, invoking a note-capture application using a single user gesture;
- receiving user input selecting one of a plurality of input modes for receiving note data;
- capturing note data from a user using the selected input mode, wherein capturing includes taking a new note while in the above-lock state;
- displaying the note data persistently on the lock screen, with only a subset of functionality of the note-capture application being available from the lock screen, wherein full functionality of the note-capture application is available below-lock, wherein the note data is a first portion of a note that is below a threshold length and upon receiving user input, displaying an entirety of the note;
- receiving user input to enter a below-lock state wherein a plurality of applications available on the mobile phone are accessible to the user;
- after a predetermined period of time without user activity, automatically entering a low-power mode;
- in response to a user request, exiting the low-power mode and automatically returning to the lock screen wherein the note data is displayed.

19. The method of claim 18, further including:
- from the lock screen, entering an application associated with the note data and receiving user input to delete the note data from the lock screen; and
- deleting the note data in response to the user input.

* * * * *